United States Patent [19]

Eckle

[11] Patent Number: 4,895,474

[45] Date of Patent: Jan. 23, 1990

[54] COUPLING SYSTEM FOR ROTATIONAL AND AXIALLY STIFF COAXIAL COUPLING OF TWO SHAFT ELEMENTS

[75] Inventor: Otto Eckle, Löchgau, Fed. Rep. of Germany

[73] Assignee: Josef Paul Huser, Meggen, Switzerland

[21] Appl. No.: 165,777

[22] Filed: Mar. 9, 1988

[30] Foreign Application Priority Data

Mar. 18, 1987 [DE] Fed. Rep. of Germany ....... 3708746

[51] Int. Cl.$^4$ .............................. F16B 2/14
[52] U.S. Cl. .................... 403/292; 403/362; 403/379; 403/409.1
[58] Field of Search .............. 403/292, 306, 296, 297, 403/300, 280, 379, 362, 305, 308, 314, 16, 374, 409.1

[56] References Cited

U.S. PATENT DOCUMENTS

| 297,153 | 4/1884 | Muir | 403/292 |
|---|---|---|---|
| 1,359,989 | 11/1920 | Hiegel | 403/292 X |
| 2,588,901 | 3/1952 | Weikart | 403/292 |
| 2,639,931 | 5/1953 | Kandle | 403/292 |
| 3,104,757 | 9/1963 | Dougherty et al. | 403/292 X |
| 3,301,581 | 1/1967 | Winberg | 403/379 |
| 4,068,957 | 1/1978 | Brems et al. | 403/296 X |
| 4,088,414 | 5/1978 | Fallein | 403/292 X |
| 4,116,573 | 9/1978 | Fuchs | 403/362 X |
| 4,299,067 | 11/1981 | Bertschi | 403/409.1 X |
| 4,756,639 | 7/1988 | Hoshino | 403/362 X |

FOREIGN PATENT DOCUMENTS 3108439 11/1982 Fed. Rep. of Germany .
3406498 10/1984 Fed. Rep. of Germany .

Primary Examiner—Andrew V. Kundrat
Assistant Examiner—Peter M. Cuomo
Attorney, Agent, or Firm—Frishauf, Holtz, Goodman & Woodward

[57] ABSTRACT

A coupling, for joining shaft elements that rotate about a common axis to one another in a rotationally and bending-resistant manner includes fit bores, concentric to the axis of rotation, in both shaft elements, the fit bores being concentrically surrounded at one face end by engagement surfaces. A fit peg that includes connection elements, which cooperate with corresponding connection and counter elements in the two shaft elements, is inserted into the fit bores.

18 Claims, 5 Drawing Sheets

COUPLING SYSTEM FOR ROTATIONAL AND AXIALLY STIFF COAXIAL COUPLING OF TWO SHAFT ELEMENTS

The present invention relates to coupling of coaxial elements, and more particularly to coupling of shaft elements, in which one of the shaft elements may be a projecting spindle of a machine tool head, and the other shaft element a shaft portion of a cutter head and the like. Such shaft elements are to be connected together to transfer torque from the machine tool spindle to the cutter element, while retaining stiffness against radial deflection as a load is placed on the cutter element during its cutting function.

Background. German Patent No. 31 08 439 is concerned with coupling of a boring rod having a standard taper end, in which the standard taper end fits a matching corresponding taper receiver of a machine spindle.

The taper end receives the engagement fit bore as well as the cross bore extending at right angles to it, which is divided by the engagement fit bore into two bore portions. Both cross bore portions include internal threads, into which a counter element formed as a screw and a tension bias element also formed as a screw are screwed. Both the tension bias element and the counter element include tapered recesses in their face ends adjoining the engagement fit bore, and these recesses are coaxial both to one another and to the axis of the cross bore.

An axial engagement fit peg is integrally formed onto the back side of the boring rod, coaxially with its axis of rotation, and surrounded by a planar, annular abutment or engagement surface, which cooperates with a likewise planar annular surface on the taper end, which surrounds the engagement fit bore. An engagement fit peg includes a cross bore approximately halfway along its length, which intersects the axis of rotation of the boring rod at right angles and the axis of which is spaced apart from the engagement surface of the boring rod by a distance slightly smaller than the spacing of the cross bar in the taper end from the engagement surface there. The connection element in the form of a smooth cylindrical bolt, having frustoconical points at both face ends, is seated in the cross bore of the engagement fit peg; these frustoconical tips cooperate with the frustoconical recesses in the tension bias element and the counter element. By screwing in the tension bias element, its tapered recess comes to engage the adjacent frustoconical tip of the connection bolt, the connection bolt being advanced toward the counter element whenever the tension bias element is screwed farther in. Finally, the other frustoconical tip of the connection bolt also enters into engagement with the tapered recess of the counter element. Since the axis of the connection bolt relative to the axis of the cross bore in the taper end is offset slightly toward the engagement surfaces, the connection bolt is pulled away from the engagement surface upon tightening of the tension bias element; as a result, because of the connection with the engagement fit peg, the engagement surfaces of the taper end and boring rod are pressed together.

If the loading during machine cutting operation on the boring rod causes rotational slippage between the taper end and the boring rod, then the tensioning force between the two elements increases, because the frustoconical tips of the connection bolt attempt to climb within the tapered recesses. The arrangement therefore has a tensioning force that increases upon loading during machine cutting operation. The torque portion that is transmitted upon loading by friction rises. The arrangement is capable of transmitting very high torques while being stiff and having resistance against bending.

It has accordingly been proposed, as shown in German Patent No. 34 06 498, to dispose the engagement fit bore directly in the machine spindle, in order to dispense with the taper end as a connecting element between the machine spindle and the tool.

It is furthermore known in practice to reverse the arrangement, so that the tool has the engagement fit bore, while the machine spindle or the taper end has the integral engagement fit peg.

An undesirable effect is that the user of one tool type is confined to the corresponding spindle or taper end structure, and the manufacturer of machine tools, taper ends, and tools must have both types available, namely those that have the engagement fit bore and those that have the integral engagement fit peg.

Although in all versions the lateral stiffness of the connection is very high, irregularities nevertheless occur in milling tools with a large overhang, and the cause of these irregularities is the variable lateral stiffness when the connection is loaded with high radial forces.

If the radial force engages parallel to the axes of the cross bore, then it tends to bend the tool and chuck against one another about an axis that extends through the edge of the engagement surfaces that are in engagement with one another. The resultant reaction force is contrarily absorbed by the remote end, relative to the axis of rotation, of the connection bolt. Consequently the force engagement point is located not on the axis of rotation but rather radially behind it. Contrarily, if the radial force is exerted in a direction at right angles to the axes of the cross bore, then unlike the above, different force induction conditions result. The pivot axis about which the two shaft elements are to be bent against one another is located on an axis that once again extends through the edge of the two engagement surfaces, but the reaction force is now no longer absorbed behind the axis of rotation, but rather, because the connection bolt extends parallel to this "bending axis", in a plane that includes the axis of rotation. The result is different lever arm ratios and also different resistances to bending, depending upon whether the radial force engages from one direction or the other. In milling, the radial force appears to revolve about the connection point, and although the same bending moments always occur at the connection point, a periodically fluctuating bending resistance arises, which can cause system oscillations.

The Invention:

It is an object to provide a coupling arrangement which is capable of transferring substantial torque, while being resistant to radial deflection of the coupled elements with respect to each other, for example to couple spindles or shafts and cutting elements or tools, in which wide differences between the spindle coupling end and the tool element end can be accepted or bridged.

Briefly, the respective shaft elements have engagement fit bores formed therein. Cross bores extending transversely through the shaft element and intersecting the engagement fit bores are provided to receive cross connection bolts. Before introducing the cross connection bolts, a coaxial peg, with holes matching the cross bores, is introduced into the engagement fit bores. The cross bolts are seated on a counter surface and a movable counter element, to retain them in position. The two shaft elements have matching flat planar engagement surfaces extending transversely to the shaft axis. When they are engaged against each other, the spacing of the central axes of the cross bores is so positioned that it is longer or wider than the spacing of the axes of the bolt cross bores extending through the coaxial engagement pag.

The end portions of the engagement peg are essentially frusto-conical; as used herein, this means that they may have somewhat spherical or ellipsoid rounded surfaces, which fit into the respective receiving elements, which upon tightening against each other, will tend to press the flat transverse engagement surfaces against each other to provide for frictional transmission of torque. Yet, some radial excursion of the respective shaft elements is possible.

For forming essentially similar cross connections both for the shaft element of, for example, a machine tool cutter, as well as for the machine spindle, it is readily possible to adapt an existing spindle to numerous cutter elements. The peg may be formed with different diameters to fit, for example, into existing engagement fit bores of existing cutter elements, to be accepted by a single standard engagement fit bore of a machine tool spindle. The coupling element, thus, provides for versatility of engagement. The tightening of the adjustable cross bolt engagement elements can be carried out automatically so that automatic tool exchange is possible.

Since both shaft elements include engagement fit bores, tools and shafts produced in this way can readily be joined to existing equipment, regardless of whether they are equipped with an integrally formed-on engagement fit peg or an engagement fit bore. The manufacturer therefore needs to manufacture only one type of tool, namely tools having an engagement fit bore. The manufacturer of machine tools is also free in this respect, and machines and tools provided with the new coupling arrangement are compatible with existing equipment. Because of the removable engagement fit peg, radially extending splines, adjusting springs or the like can easily be machined into the engagement surfaces.

DRAWINGS:

FIG. 1 is a longitudinal section through two shaft elements joined together by a coupling according to the invention;

FIG. 2 in plan view is a phantom representation of the coupling of Fig. 1;

FIG. 3 shows an engagement fit peg for the coupling of FIG. 1 in which the cross bores are located axially parallel;

FIG. 4 shows an engagement fit peg for the coupling of FIG. 1, with the cross bores for the coupling of shaft elements, in which the engagement fit bore has a different diameter, being arranged at right angles, to one another; and FIGS. 5a and 5b are schematic views of the view of the seat of a connection element in the associated counter element, with a different spacing difference between the axes of the cross bore in the engagement fit peg and the axes of the cross bores in the two shaft elements.

DETAILED DESCRIPTION:

Figure 1:
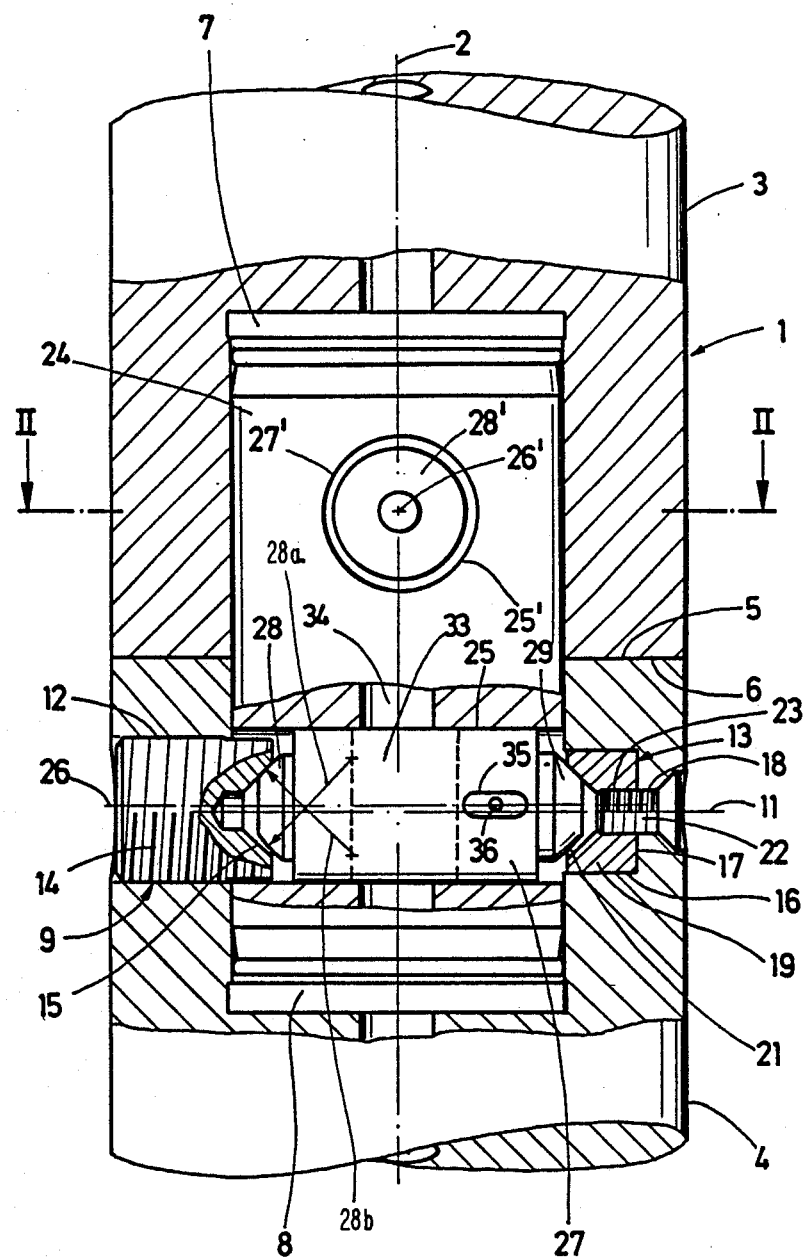

FIG. 1 is a cross-sectional view of a coupling 1 for connecting two elements 3 and 4, in particular shaft elements, having a common axis of axis of rotation 2, in a manner that is fixed against relative rotation and resistant to bending. The elements 3 and 4 may be rotating or stationary shafts, tools or other machine parts. For instance, the elements 3 and 4 may be two shaft ends to be coupled together, or one element may be a milling tool, boring rod or the like while the other element is a machine tool spindle. The cylindrical elements 3 and 4 shown are therefore merely examples for any possible machine parts to be coupled together, in which the torque is to be transmitted from one shaft element to the other of the shaft elements 3, 4 in a manner that is stiff and resistant to bending.

Both shaft elements 3 and 4 each have one flat planar abutment or engagement surface 5 and 6, each surface extending at right angles to the axis of rotation 2. These two engagement surfaces 5 and 6 abut one another in a planar fashion.

The one shaft element 3 includes an engagement fit bore 7 formed as a blind bore concentric with the axis of rotation 2 and penetrating the engagement surface 5, so that this surface has a circular-annular shape. The fit bore 7 is cylindrical and has smooth walls.

A further engagement fit bore 8, likewise cylindrical and smooth-walled, is included in the shaft element 4. The engagement fit bore 8 located there is again formed as a blind bore concentric with the axis of rotation 2 and penetrates the engagement surface 6, which therefore has a circular-annular shape. Both engagement fit bores 7 and 8 have the same diameter and the same depth, measured from the associated engagement surface 5, 6.

Between the engagement surface 6 and the inward end of the engagement fit bore 8, the shaft element 4 includes a cross bore 9, the axis 11 of which intersects the axis of rotation 2 at right angles. The cross bore 9 is formed as a stepped bore and penetrates the shaft element 4 on both sides of the fit bore 8. Cross bore 9 is subdivided by fit bore 8 into portions 12 and 13. Portion 12 is threaded to receive a threaded pressure screw 14 which can be rotated from the outside of cross bore 9. The pressure screw 14 is formed with a frustoconical recess 15 concentric with axis 11, which widens towards the axis of rotation 2, that is, towards the engagement fit bore 8.

The portion 13 of the cross bore 9 comprises a part 16 of large diameter, which via a planar annular shoulder 17 merges with a part 18 of smaller diameter. A thrust pad or plug 19 is located in the bore part 16. Pad 16 is cylindrical on the outside and has a frustoconical recess 21 the dimensions of which correspond to those of the frustoconical recess 15 of screw 14.

The portion 13 of the cross bore 9 comprises a part 16 of large diameter, which via a planar annular shoulder 17 merges with a part 18 of smaller diameter. A thrust pad 19 that is cylindrical on the outside and has a frustoconical recess 21 the dimensions of which correspond to those of the frustoconical pad 19 is inserted into the part 16; the recess 21 also extends toward the fit bore 8. The thrust pad 19 is retained by means of a socket-head screw 22, which is seated in the part 18 of the bore portion 13 and is screwed into a threaded bore 23 of the thrust pad 19.

An identically formed and located cross bore 9' (FIG. 2) is also provided in the shaft element 3. The same numerals are used for the components of its cross bore 9' as for the cross bore 9, except that those for the cross bore 9' are provided with a prime notation. Since the only difference between the two bores 9 and 9' is that one is included in the shaft element 4 and the other in is that one is included in the shaft element 4 and the other in the shaft element 3, no further description is necessary here.

A cylindrical engagement fit peg 24, which is smooth-walled on the outside, and by way of which the two shaft elements 3 and 4 are held together, is seated in the chamber defined by the two engagement fit bores 7 and 8, which are aligned with one another. The engagement fit peg 24 has two spaced-apart cross bores 25, 25' located at right angles to one another, the axes 26 and 26' of which intersect the longitudinal axis of the engagement fit peg 24 and hence the axis of rotation 2. They are continuously cylindrical and smooth-walled and have the same diameter. The spacing apart of their axes 26 and 26' is slightly smaller than the spacing between the two axes 11 and 11' of the cross bores in the shaft elements 3 and 4, when the two shaft elements 3 and 4 are resting on one another with their engagement surfaces 5 and 6; the axes 11 and 11' are at the same time the axes of the frustoconical recesses 15 and 21 or 15' and 21', respectively.

A cylindrical bolt 27 is seated in the cross bore 25 acting as a connection element, having generally frustoconical extensions 28 and 29 on both of its face ends; the axis of the extensions, and the axis of the bolt 27 is once again the axis 26. The two extensions 28 and 29 are identical to one another and taper in the direction leading away from the face ends of the bolt 26. The generatrix of the essentially frustoconical extensions having a convex generated surface is a circular arc. This arc extends such that in each sectional plane through the essentially frustoconical extensions 28 and 29 the center point of the circular arc is located on the other side, of the axis 26 of the connection bolt 27, from the surface line generated by the sectional plane; see radii 28a and 28b. "Essentially frustoconical" thus means surfaces which are somewhat spherical or ellipsoid rounded surfaces.

To enable unhindered insertion of the engagement fit peg 24 into the engagement fit bore 7 or 8, the length of the connection bolt 27 measured over the two extensions 28 and 29 is slightly shorter than the diameter of the engagement fit peg 24. In the tensioned state, the two extensions 28 and 29 cooperate with the frustoconical recesses or tapered sockets 15 and 21, in which they come to rest, as FIG. 1 shows.

A further connection bolt 27', having the same structure and the same dimensions as the connection bolts 27, is inserted into the cross bore 25'. The connection bolt 27' cooperates with the frustoconical recesses or tapered sockets 15' and 21'.

Assembly:

The coupling 1 is assembled as follows: after insertion of the connection bolt 27 into the cross bore 25, the engagement fit peg 24 is inserted into the engagement fit bore 8, once the pressure screw 14 has previously been rotated backward far enough that its inward end face having the frustoconical recess 15 is recessed behind the wall of the fit bore 8. The fit peg 24 is inserted far enough into the fit bore 8 that its cross bore 25 is approximately in alignment with the cross bore 9. The pressure screw 14 can now be screwed back in again, its inward end coming to engage the adjoining extension 28 of the connection bolt 27. With further insertion of the pressure screw 14 in the direction toward the thrust pad, the connection bolt 27 is advanced, the pressure screw 14 at the same time engaging more or less deeply inside the cross bore 25. When the pressure screw 14 is tightened, the essentially frustoconical extensions 28 and 29 automatically center themselves in the frustoconical recesses 15 and 21, being pressed with a corresponding force against the walls of the recesses 15 and 21.

As soon as the fit peg 24 is fixed in this way in the shaft element 4, the same process is repeated with the shaft element 3 and the connection element 27' contained in the cross bore 25'. The spacing of the axes of the two cross bores 26 and 26' from one another is smaller by 0.1 mm to 0.5 mm than the spacing of the cross bores 9 and 9' with axes 11, 11' when the engagement surfaces 5 and 6 rest on one another; as a result, upon tightening of the pressure screw 14', a force component is produced at the inclined faces of the extensions 28, 28', 29, 29' of the two connection bolts 27, 27' in combination with the inclined faces of the frustoconical recesses 15, 21, 15' and 21', and this force component extends in the direction parallel to the axis of rotation 2 and hence presses the engagement surfaces 5 and 6 against one another to provide a friction coupling therebetween.

The pressing force is amplified if a torque is transmitted via the coupling 1 that overcomes the friction between the frictionally coupled engagement surfaces 5 and 6 and causes a rotation of the shaft elements 3 and 4 relative to one another. In this process the connection bolts 27 and 27' are carried along correspondingly and tend to laterally deflect in the frustoconical recesses 15 and 21 or 15' and 21' and hence move away from the engagement surfaces 5, 6 untightened in which the connection bolts have some play in the direction parallel to the axis of rotation 2. Lateral delection of bolts 27, 27' results in a further shortening of the distance of the spacing between axes 11 and 26; and 11', 26'. The pressing force acting upon the two engagement surfaces 5, 6 increases accordingly. Because of the slight rise of the frustoconical recesses 15, 21 or 15', 21' in the lower region or in other words the region adjoining the engagement surfaces 5, 6, this amplification effect is very strong.

The coupling 1 shown has a very uniform bending resistance, with respect to the azimuth angle about the axis of rotation 2. Initially, let it be assumed that a radial force is acting on the shaft element 4 at right angles to the axis 26. The resultant bending moment tends to bend the two shaft elements 3 and 4 about an axis that extends parallel to the axis 26 and through the edge of the two engagement surfaces 5 and 6. The counter force is then absorbed by the two extensions 28, 29 on the axis 26; that is, the spacing of the two transverse forced that absorb the bending moment is equal to the radius of the two engagement surfaces 5 and 6. Correspondingly the same geometrical conditions apply when the transverse force engages at right angles to the axis 26', because then the transverse forces in the least favorable case must be absorbed by the connection bolt 27'. In this case as well, the spacing of the transverse forces absorbing the bending moment, which act parallel to the axis of rotation 2, is equal to the radius of the engagement surfaces 5 and 6. The greatest stiffness arises if the transverse force occurs at an angle of 45° to the two axes 26 and 26', because in that case, as will readily be understood, the reaction force engages behind the axis of rotation 2. The spacing of the transverse forces is here equal to the radius of the engagement surfaces 5, 6, plus approximately one-half the length of the connection bolt 27 or 27' times 0.7.

The coupling 1 therefore provides a better course of the bending resistance, compared with a coupling in which the fit peg 24 is integrally connected to one of the shaft elements 3, 4. In that case, the fluctuation in the bending resistance would be substantially greater.

If the fit peg 24 is to be retained in captive fashion in one of the shaft elements 3, 4, then at this point an underdimension or undersize may be provided between the fit bore 7 or 8 and the fit peg 24; depending on the diameter of the fit bores 7 or 8, this undersize can range between 0 and 15μm. This undersize can be produced either by providing a continuously cylindrical fit peg 24, in which case the corresponding fit bore 7, 8 has the desired undersize, or else the fit peg 24 has a corresponding oversize at the end inserted into the particular fit bore 7, 8. In that case, although the fit peg 24 is still cylindrical over its entire length, it has a stepwise change in diameter, which is located approximately in the middle between the two cross bores 25, 25'. The two portions produced are then, as shown in FIG. 3, preferably separated from one another by means of a rounded hollow throat 32, which when the coupling is joined together is located in the vicinity of the two engagement surfaces 5, 6.

If an undersize exists between the two fit bores 7 and 8 with respect to the fit peg 24, very good centering conditions are attained upon joining of the coupling 1, which then, however, is assembled only by the manufacturer and is not intended to be dismantled and reassembled frequently.

Figure 2:
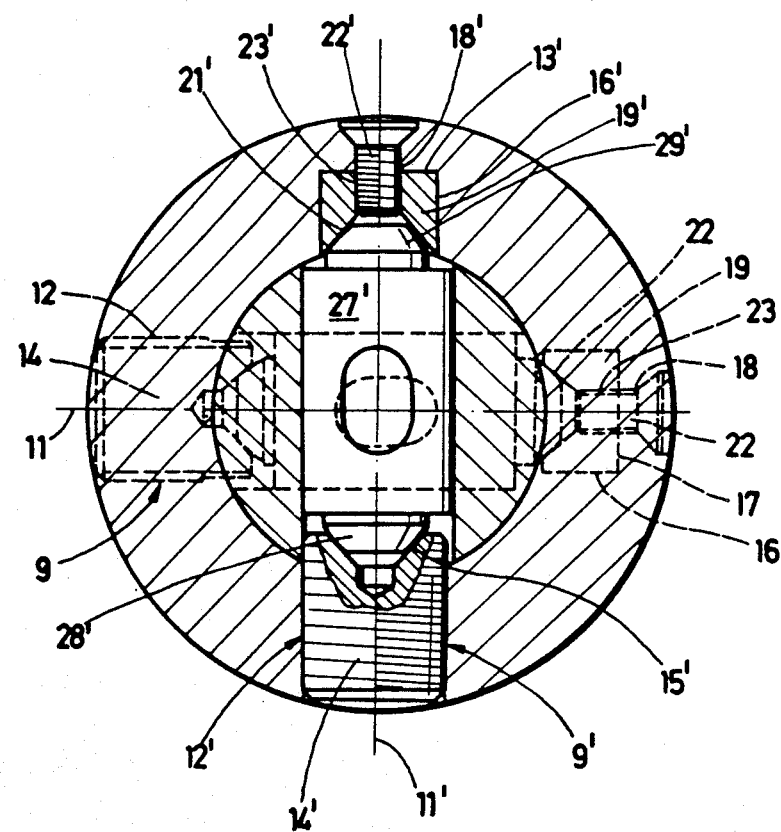
Figure 3:
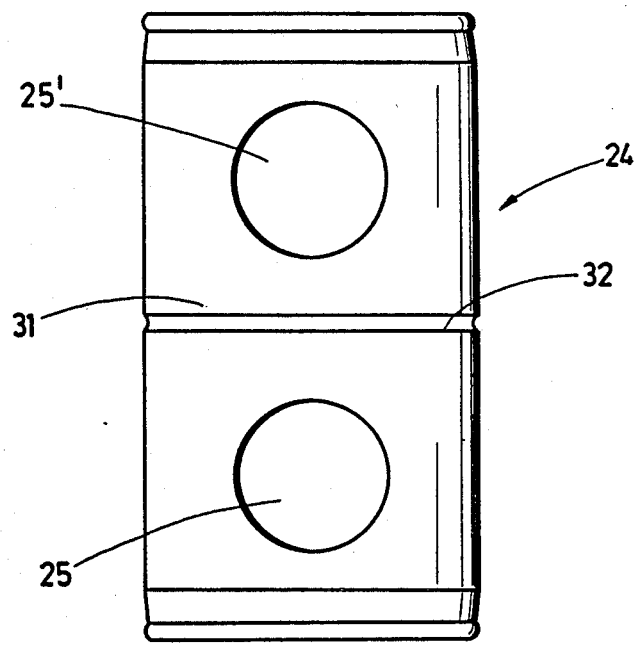

In addition to the embodiment shown in FIGS. 1 and 2 of the fit peg 24, the engagement fit peg 31 shown in FIG. 3 can also be used, in which the two cross bores 25 and 25' are axially parallel to one another. The fit peg 31 is used whenever it is less important to generate over a revolution of the shaft, the most uniform possible bending resistance and more important to furnish a certain azimuth angle between the two elements 3 and 4 to be coupled together, this angle deviating from the azimuth angle that is attainable by means of the fit peg 24. Depending on the angle with which the two cross bores 25 and 25' are manufactured, relative to the axis of rotation 2, arbitrary azimuth angles can be generated between the two shaft elements 3 and 4.

If an actuating device concentric with the axis of rotation 2 is also to be guided via the coupling 1, then a corresponding through opening 33 or 34 can readily be provided in both the fit peg 24 and the two connection bolts 27 and 27'. The openings 33 in the connection bolts 27 and 27' are preferably formed as oblong slots, so that the actuating element can be guided through them in either the tensioned position or in the position in which the connection bolt 27 or 27' is recessed with its two extensions 28, 29 with respect to the outside circumferential surface of the fit peg 24.

It is also possible for the connection bolts 27 and 27' to be retained in captive fashion in the associated cross bores 25, 25', by machining an elongated oval groove 35, closed at the edges, into the outside circumferential face of the connection bolt 27, 27'. This groove 35 extends parallel to the longitudinal axis 26, 26' of the connection bolt 27, 27'. A pin 36, which is inserted with a press fit into a corresponding bore of the fit peg 24, is located slidably in the groove 35. The maximum displacement stroke of the connection bolt 27, 27' is then defined by the length and the location of the groove 35 in cooperation with the pin 36.

Figure 4:
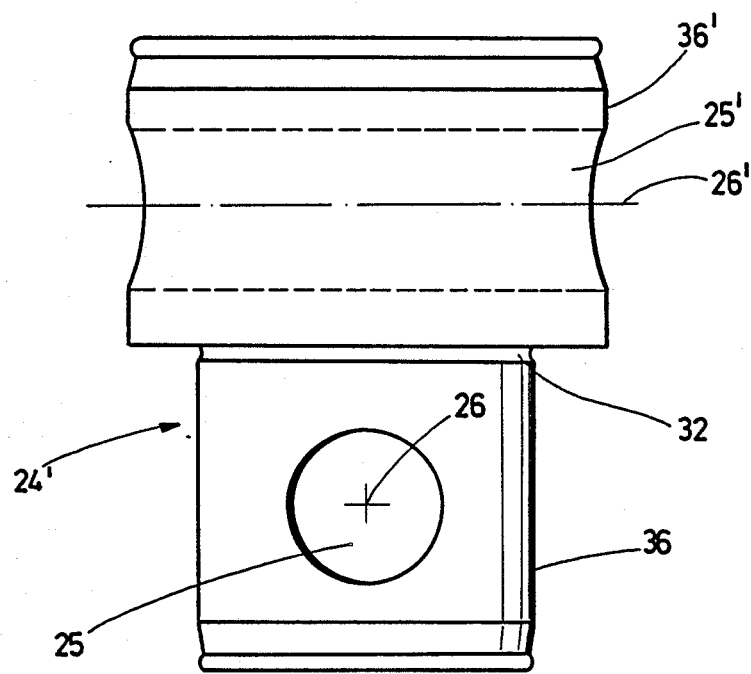

With the above-described coupling 1, it is also possible to join shaft elements 3, 4 to one another that have fit bores 7, 8 of which the diameters deviate sharply from one another. In this case, the fit peg 24' shown in FIG. 4 is used, which approximately halfway between its two cross bores 25, 25' has a diameter jump, so that two mutually coaxial cylindrical portions 37, 37' are produced, which are adapted in their diameter to the diameter of the respective fit bore 7, 8.

By varying the spacing of the longitudinal axes 26, 26' of the cross bores 25, 25' as compared with the spacing of the axes 11, 11' of the cross bores 9, 9' in the two shaft elements 3, 4, the reversible slippage that the two shaft elements 3, 4 exhibit relative to one another under load can be adjusted. This relationship is explained with reference to FIGS. 5a and 5b. These figures show two highly schematic sections in one plane, which intersects the axes 26 and 11 at right angles and extends at the point at which the extension 28 or 29 of the connection bolt 27 touches the associated tapered socket 15 or 21 in the corresponding counter element 14, 19.

Figure 5A:
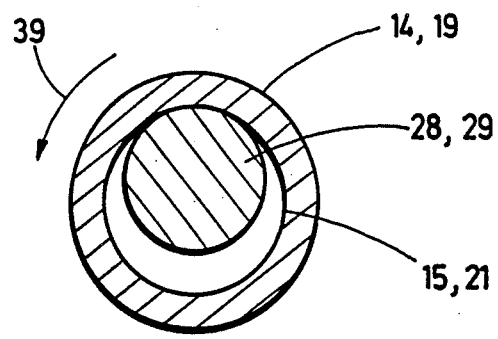
Figure 5B:
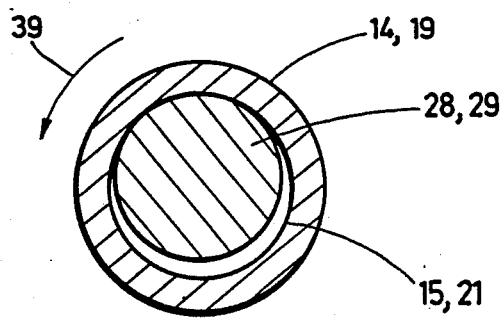

If the spacing difference is large, then in the last connection bolt to be tightened, for instance the connection bolt 27, the extensions 28, 29 will penetrate only a short distance into the associated tapered sockets 15, 21, as shown schematically in FIG. 5a. Without a torque load on the two shaft elements 3 and 4 relative to one another, this contact point will be immediately adjacent the two engagement surfaces 5, 6. If a torque arises at the two shaft elements 3 and 4 that tends to rotate the shaft elements 3 and 4 relative to one another with respect to the axis of rotation 2, then the contact point between the tapered sockets 15, 21 and the extensions 28, 29 will tend to deflect laterally in the rotational direction, as soon as the friction between the two abutting engagement surfaces 5, 6 is overcome. The contact point between the tapered sockets 15, 21 and the extensions 28, 29 will for example tend to migrate in the direction of an arrow 39. Since this migration simultaneously means an increase in the spacing of the engagement points with which the two connection bolts 27, 27' are anchored in the two shaft elements 3, 4, the result is an increasing tension bias force, which presses the two engagement surfaces 5, 6 against one another. The extreme position is present whenever the engagement point between the extensions 28, 29 and the tapered sockets 14, 19 has migrated 90° laterally from the position shown in FIG. 5a. Since because of the selection of the axial spacing of the cross bores 25, 25' with respect to the axial spacing of the cross bores 9, 9' the extensions 28, 29 penetrate only a short distance into the conical sockets 14, 19, comparatively large rotational movements between the elements 5, 6 can be executed, before the connection bolts 27, 27', by their lateral engagement in the associated tapered sockets 15, 21, block any further rotation. Contrarily, if the spacing difference between the axes 26, 26' and the axes 11, 11' is less than in the previously mentioned example, the extensions 28, 29 will be able to penetrate more deeply into the associated tapered sockets 15, 21. The difference in diameter of the circles in the plane of contact, which defines the tapered socket 15, 21 with respect to the circle that generates the sectional plane at the extension 28, 29 will correspondingly likewise be smaller than in the previously mentioned example. This other diameter difference is schematically illustrated in FIG. 5b. In the plane that on the one hand intersects the longitudinal axis 26 at right angles and on the other hand includes the contact point between the corresponding extension 28, 29 and the tapered socket 15, 21, the extension 28, 29 has less play in the circumferential direction, with respect to the axis 2, than in the previous example. Consequently, at a torque that is less than in the previous example between the shaft elements 3 and 4, the contact point will be deflected from the illustrated position by 90° in the direction of the arrow 39 as compared with what is necessary in the previous exemplary embodiment. Therefore a positive locking of the rotational motion of the shaft elements 3, 4 with respect to one another will occur at an even lesser torque than in the situation shown in FIG. 5a.

By corresponding selection of the engagement fit peg 24, the rotational slippage of the coupling 1 can therefore be controlled. If the spacing difference of the cross bore in the fit peg 24 is small compared with the cross bores in the shaft elements 3, 4, then a connection having relatively small reversible rotational slippage is produced, compared with an arrangement in which the spacing difference is greater. In each case, when the coupling 1 is relieved, the connection bolt 27 in the counter elements 14, 19 returns reversibly to the positions shown in FIGS. 5a and 5b. In this way, the coupling 1 is programmably resilient.

If the cross bores 25, 25' are disposed at right angles to one another in the engagement fit peg 24, 24', 31, then with a revolving radial force that causes a bending moment revolving about the connection point, virtually constant conditions in terms of bending stiffness are attained, because in both extreme positions, one of the connection bolts 27, 27' extends at right angles and the other extends parallel to the radial force engaging them. The bending stiffness of the arrangement will therefore fluctuate within a substantially narrower range than if the engagement fit peg 24, 24', 31 were integrally connected to one of the shaft elements 3, 4.

Moreover, by using the new coupling 1 it is possible to produce very long shafts, such as boring rods and the like, from individual shaft elements 3, 4, each coupling point acting so as to damp oscillation.

If the engagement fit peg 24, 24', 31 is seated with an interference fit in at least one or only one engagement fit bore 7, 8, then the engagement fit peg 24, 24', 31 is retained in captive fashion in this engagement fit bore 7, 8, and it will not lose its centered seating even if the two shaft elements 3, 4 are separated from one another in the vicinity of the coupling 1.

Under load, the coupling arrangement 1 exhibits a certain rotational slippage of the two shaft elements 3, 4 relative to one another, because of a torque with respect to the center axis of the two shaft elements 3, 4, and this slippage is reversible as the torque disappears. This rotational slippage, which shifts the azimuth angle of the two shaft elements 3, 4 relative to one another, can be advantageous or deleterious, depending on the use. The rotational slippage is for instance advantageous if one of the shaft elements 3, 4 is a boring tool or the like, because in that case should the boring tool seize, the rotational slippage is sufficient to generate a slower increase of force up to the time the drive is shut off, compared with the case in which both shaft elements are joined together practically without rotational slippage. This also protects the drive and the bearing.

In certain applications, as little rotation as possible should occur between the two shaft elements 3, 4 when under load, and this dictates as slip-free coupling of the shaft elements 3, 4 as possible. An application of this type is for example when the cutting tip of a boring tool is used for rotation. Rotation of the coupled shaft elements 3, 4 relative to one another would cause shifting in the cutting tip and hence a change in diameter in the workpiece being machined.

In the novel coupling, the rotational slippage that the two shaft elements 3, 4 exhibit relative to one another under load can be varied very simply by providing that the longitudinal axes of the cross bores 25, 25' in the engagement fit pegs 24, 24', 31 be smaller, by a more or less large amount, than the spacing of the longitudinal axes 11, 11' in the cross bores 9, 9' of the two shaft elements 3, 4 to be coupled to one another. Depending upon how the spacing difference is selected, the connection elements 27, 27' have a variably large travel available, so that under load they can be deflected radially or laterally into the tapered sockets 15, 21. The more precise the axial spacing of the cross bores 25, 25' in the engagement fit peg 24, 24', 31 approaches the axial spacing of the cross bores 9, 9' in the two shaft elements 3, 4 to be coupled, the smaller is the possible rotational slippage.

Various changes and modifications may be made, and features described in connection with any one of the embodiments may be used with any of the others, within the scope of the inventive concept.

I claim:

1. Coupling system for rotational and axially stiff coaxial coupling of a first rotatable shaft element (3) to a second rotatable shaft element (4), defining a central axis of rotation (2), each of said shaft elements being formed with flat transverse matching frictionally engaged, abutting engagement surfaces (5, 6), comprising the combination of a first cylindrical concentric engagement fit bore (7) formed in the first shaft element (3);

a second cylindrical concentric engagement fit bore (8) formed in the second shaft element (4);

a first cross bore (9') extending transversely through the first shaft element (3) and intersecting the first engagement fit bore (7), said first cross bore being subdivided by the first engagement fit bore (7) into two diametrically located first bore portions (12', 13'), and having an axis (11') intersecting the central axis (2) at a right angle;

a second cross bore (9) extending transversely through the second shaft element (4) and intersecting the second engagement fit bore (8), said second cross bore being subdivided by the second engagement fit bore (8) into two diametrically located second bore portions (12, 13), and having an axis (11) intersecting the central angle (2) at a right angle;

a coaxial engagement fit peg (24, 24', 31) located in both the first and second engagement fit bores (7, 8), fitting snugly therein and connecting said shaft elements together;

a first bolt cross bore (25') defining a first bolt cross bore axis (26') extending transversely through the engagement peg (24, 24', 31) at a level of the first cross bore (9') when the peg is positioned in the first engagement fit bore (7);

a second bolt cross bore (25) defining a second bolt cross bore axis (26) extending transversely through the engagement peg at a level of the second cross bore (9) when the peg (24, 24', 31) is positioned in the second engagement fit bore (8);

said first and second cross bores (9, 9') through the first and second shaft sections (3, 4) and the first and second bolt cross bores (25', 25) through said coaxial fit plug (24, 24', 31) being axially spaced from each other and from said frictionally engaged abutting engagement surfaces (5, 6);

a first longitudinally adjustable cross bolt engagement element (14') located in one (12') of said first cross bore portions;

a first cross bolt counter element (19') located in the other (13') of said first cross bore portions;

a second longitudinally adjustable cross bolt engagement element (14) located in one (12) of said second cross bore portions;

a second cross bolt counter element (19) located in the other (13) of said second cross bore portions;

a first connection bolt (27') located in the first cross bore (9') and having essentially frustoconically interfitting end portions (28', 29') engageable, respectively, with the first cross bolt engagement element (14') and the first cross bolt counter element (19');

a second connection bolt (27) located in the second cross bore (9) and having essentially frustoconically interfitting end portions (28, 29) engageable, respectively, with the second cross bolt engagement element (14) and the second cross bolt counter element (19); and wherein, upon engagement of said engagement surfaces (5, 6), the spacing of the axes (11, 11') of the first and second cross bores (9, 9') is longer than the spacing of the axes (26, 26') of the first and second bolt cross bores (25, 25') extending through the coaxial engagement peg (24, 24', 31) and said engagement surfaces are frictionally engaged upon longitudinal adjustment of said first and second cross bolt engagement elements (14', 14).

2. The coupling of claim 1, wherein the projections of the axes (26, 26') of the cross bores (25, 25') of the engagement fit peg (24, 24', 31) intersect in a plane at right angles to the axis (2), at an angle between 0° and 90°.

3. The coupling of claim 1, wherein the projections of the axes (26, 26') of the cross bores (25, 25') of the engagement fit peg (24, 24', 31) intersect in a plane at right angles to the axis (2), at a right angle.

4. The coupling of claim 1, wherein the engagement fit peg (24, 24', 31) has a constant diameter, at least in a longitudinal portion including both cross bores (25, 25').

5. The coupling of claim 1, wherein the engagement fit peg (24', 31) is divided into two cylindrical portions (36, 36') coaxial with one another, which have different diameters and each of which includes one cross bore (25, 25').

6. The coupling of claim 1, wherein the engagement fit peg (24, 24', 31) is inserted into the fit bore (7, 8) of at least one shaft element (3, 4) with an interference fit.

7. The coupling of claim 6, wherein the dimensional difference for the interference fit is between 0μm and 15μm.

8. The coupling of claim 1, wherein the engagement fit peg (24, 24', 31) is inserted into the fit bore (7, 8) of only one shaft element (3, 4) with an interference fit.

9. The coupling of claim 1, wherein the spacing of the axis (11) of the cross bore (9) in one shaft element (4) from the associated engagement surface (6) is equal to the spacing of the axis (11') of the cross bore (9') in the other shaft element (3) from the associated engagement surface (5).

10. The coupling of claim 1, wherein both connection elements (27, 27') are identical.

11. The coupling of claim 1, wherein both connection elements (27, 27') include a through opening (33, 33') extending transversely to their longitudinal axis (26, 26'), and the engagement fit peg (24) includes a coaxial longitudinal bore (33).

12. The coupling of claim 1, wherein at least one of the connection elements (27, 27') is retained in captive fashion in the respective cross bore (25, 25').

13. The coupling of claim 12, wherein the connection elements (27, 27') are secured against rotation beyond a predetermined limited with respect to their longitudinal axis (26, 26') in the respective cross bore, 25, 25').

14. The coupling of claim 1, wherein the reversible rotational slippage occurring between the two shaft elements (3, 4) at a torque with respect to the axis (2) is predeterminable.

15. The coupling of claim 14, wherein the spacing of the axes (11, 11') of the first and second cross bores (9, 9') from the axes (26, 26') of the first and second bolt cross bores (25, 25') is selectable to provide for controlled rotary slippage and wherein, for relatively greater rotary slippage, said spacing is smaller than for relatively smaller rotary slippage.

16. The coupling of claim 1, wherein the end portions of the connection bolts (27, 27') and the end portions of the respective cross bolt engagement elements (14, 14') and of the counter elements (19, 19') are interfitting by an at least approximately or essentially conical projection-and-recess fit formed by projections and recesses.

17. The coupling of claim 16, wherein at least one of the interfitting projections and recesses are part-spherical.

18. The coupling of claim 16, wherein at least one of the interfitting projections and recesses are part-spherical and define two spherical portions having respective centers which are axially above and below a longitudinal axis (26, 26') of the respective connection bolt (27, 27').

* * * * *